United States Patent
Symes, Jr. et al.

(10) Patent No.: US 8,114,801 B2
(45) Date of Patent: Feb. 14, 2012

(54) COG DIELETRIC COMPOSITION FOR USE WITH NICKEL ELECTRODES

(75) Inventors: Walter J. Symes, Jr., Dundee, NY (US); Mohammed H. Megherhi, Victor, NY (US); Elisabeth W. J. Römer, LD Uden (NL); Mike S. H. Chu, Lewiston, NY (US); Willibrordus J. L. M. J. Coppens, WL Uden (NL)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 12/945,932

(22) Filed: Nov. 15, 2010

(65) Prior Publication Data

US 2011/0090619 A1    Apr. 21, 2011

Related U.S. Application Data

(62) Division of application No. 10/599,925, filed as application No. PCT/US2006/035426 on Sep. 13, 2006, now Pat. No. 7,858,548.

(60) Provisional application No. 60/721,477, filed on Sep. 28, 2005.

(51) Int. Cl.
*C04B 35/00* (2006.01)
*C04B 33/32* (2006.01)
*H01G 4/06* (2006.01)
*B28B 3/00* (2006.01)

(52) U.S. Cl. ..... 501/136; 501/134; 501/135; 361/321.4; 361/321.5; 264/615

(58) Field of Classification Search .................. 501/15, 501/20, 21, 134, 135, 136; 361/321.4, 321.5, 361/321.3; 264/615
See application file for complete search history.

(56) References Cited

U.S. PATENT DOCUMENTS

| | | | |
|---|---|---|---|
| 4,223,369 A | | 9/1980 | Burn |
| 4,700,264 A | * | 10/1987 | Kishi et al. ................. 361/321.4 |
| 4,987,108 A | | 1/1991 | Takagi et al. |
| 5,070,047 A | | 12/1991 | Gardner et al. |
| 5,071,794 A | | 12/1991 | Shaikh |

(Continued)

FOREIGN PATENT DOCUMENTS

JP    2003146697    5/2003

(Continued)

OTHER PUBLICATIONS

Search Report for Corresponding Application PCT/US06/35426, dated Feb. 9, 2007, 14 pages.

*Primary Examiner* — Karl Group
*Assistant Examiner* — Noah Wiese
(74) *Attorney, Agent, or Firm* — Rankin, Hill & Clark LLP

(57) ABSTRACT

Multilayer ceramic chip capacitors which satisfy COG requirements and which are compatible with reducing atmosphere sintering conditions so that non-noble metals such as nickel and nickel alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers comprise a strontium zirconate matrix doped with other metal oxides such as $TiO_2$, $MgO$, $B_2O_3$, $CaO$, $Al_2O_3$, $SiO_2$, and $SrO$ in various combinations.

11 Claims, 1 Drawing Sheet

U.S. PATENT DOCUMENTS

| | | |
|---|---|---|
| 5,120,579 A | 6/1992 | Gardner et al. |
| 5,128,289 A | 7/1992 | Wilson |
| 5,164,342 A | 11/1992 | Muralidhar et al. |
| 5,258,335 A | 11/1993 | Muralidhar et al. |
| 5,361,187 A | 11/1994 | Srinivasan |
| 5,397,830 A | 3/1995 | Shaikh et al. |
| 5,571,767 A | 11/1996 | Wilson et al. |
| 5,599,757 A | 2/1997 | Wilson et al. |
| 5,604,167 A | 2/1997 | Wilson et al. |
| 5,756,408 A | 5/1998 | Terashi et al. |
| 5,783,165 A | 7/1998 | Wilson et al. |
| 5,998,036 A | 12/1999 | Stein et al. |
| 6,355,586 B1 | 3/2002 | Usui et al. |
| 6,429,163 B2 | 8/2002 | Kim et al. |
| 6,645,895 B2 | 11/2003 | Sato et al. |
| 6,656,863 B2 | 12/2003 | Fukui et al. |
| 7,157,396 B2 * | 1/2007 | Watanabe et al. ............. 501/135 |
| 7,858,548 B2 * | 12/2010 | Symes et al. .................. 501/136 |
| 2004/0229746 A1 | 11/2004 | Park et al. |
| 2005/0128683 A1 * | 6/2005 | Watanabe et al. .......... 361/321.4 |
| 2006/0232910 A1 | 10/2006 | Megherhi et al. |

FOREIGN PATENT DOCUMENTS

| | | |
|---|---|---|
| JP | 2005094026 | 4/2005 |

* cited by examiner

COG DIELETRIC COMPOSITION FOR USE WITH NICKEL ELECTRODES

This application is a divisional application that claims priority to application Ser. No. 10/599,925, now U.S. Pat. No. 7,858,548, filed Dec. 13, 2006 which claims priority to provisional application Ser. No. 60/721,477 filed 28 Sep. 2005 and application PCT/US2006/35426 filed 13 Sep. 2006, all of such applications incorporated herein by reference.

BACKGROUND OF THE INVENTION

1. Field of Invention

This invention relates to a zirconate titanate based dielectric composition, and more particularly to a strontium-zirconate-titanate-based dielectric composition that can be used to form multilayer ceramic chip capacitors having internal base metal electrodes formed of nickel or nickel alloys.

2. Description of Related Art

Multilayer ceramic chip capacitors have been widely utilized as miniature-sized, high capacitance and high reliability electronic components. In accordance with increasing demands for high-performance electronic equipment, multilayer ceramic chip capacitors also have encountered marketplace demand for smaller size, higher capacitance, lower cost, and higher reliability.

Multilayer ceramic chip capacitors generally are fabricated by foaming alternating layers of an internal electrode forming paste and a dielectric layer-forming paste. Such layers are typically formed by sheeting, printing, or similar techniques, followed by concurrent firing.

Generally, the internal electrodes have been formed of conductors such as palladium, gold, silver or alloys of the foregoing. Although palladium, gold and silver are expensive, they can be partially replaced by the use of relatively inexpensive base metals such as nickel and its alloys. A "base metal" is any metal other than gold, silver, palladium, and platinum. Base metal internal electrodes can become oxidized if fired in ambient air, so the dielectric layers and internal electrode layers must be co-fired in a reducing atmosphere. Firing in a reducing atmosphere, however, causes the dielectric layers to be reduced, which decreases resistivity. Multilayer ceramic chip capacitors using non-reducible dielectric materials have been proposed, however, such devices typically have a shorter life of insulation resistance (IR) and low reliability.

The Electronic Industry Association (EIA) prescribes a standard for the temperature coefficient of capacitance (TCC) known as the COG characteristic. The COG characteristic requires that the change of capacitance be no greater than 30 ppm per degree centigrade (±30 ppm/° C.) over the temperature range −55° C. to +125° C. COG components do not exhibit capacitance aging.

SUMMARY OF THE INVENTION

The present invention provides a dielectric composition that can be used to make ceramic multilayer capacitors compatible with internal electrodes containing base metals such as nickel or nickel alloys. Capacitors may be formed from the dielectric composition of the present invention to exhibit a stable dielectric constant with a small dielectric loss and excellent reliability under highly accelerated life testing conditions.

The dielectric composition of the present invention comprises a uniform dense microstructure of grains having an average diameter of about 0.5 to about 3 microns. A uniform and dense grain microstructure is critical in achieving high reliability multilayer capacitors having dielectric layers thinner than 5 microns.

In one embodiment, the dielectric composition of the present invention comprises, prior to firing, a blend of the oxides of strontium, titanium, and zirconium. Oxides to aid in sintering such as MgO, $B_2O_3$, and MgO—CaO—SrO—$Al_2O_3$—$SiO_2$ may be added. Another embodiment of the present invention is an electronic device comprising a multilayer chip comprising a dielectric layer comprising a strontium-zirconate-titanate mix and a magnesium oxide-boron oxide mix. Yet another embodiment of the present invention is an electronic device comprising a multilayer chip comprising a dielectric layer comprising a strontium zirconate titanate mix and a MgO—CaO—SrO—$Al_2O_3$—$SiO_2$ mix.

In another embodiment, the present invention provides a method of forming an electronic component comprising applying particles of a dielectric material to a substrate and firing the substrate at a temperature sufficient to sinter the dielectric material, wherein the dielectric material comprises, prior to firing, a blend (in weight percent) of the ingredients in Table 1. It is to be understood that each numerical value herein (percentage, temperature, etc) is presumed to be preceded by "about."

TABLE 1

Oxide formulations of dielectric compositions.

|  | SrO | $ZrO_2$ | $TiO_2$ | $B_2O_3$ | MgO |
|---|---|---|---|---|---|
| wt % | 41.5-48.5 | 47-55 | 1-2 | 0.05-3 | 0.05-1.5 |

Another route is to begin with strontium carbonate, titanium dioxide, and zirconium oxide. The composition can also be made by firing a blend of one or more pre-reacted oxides such as $SrTiO_3$ or $SrZrO_3$. In this regard, the formulation of Table 2 will result in approximately the same dielectric material as that made by the formulation of Table 1.

TABLE 2

Alternate formulation for dielectric material.

|  | $SrCO_3$ | $TiO_2$ | $ZrO_2$ | MgO | $B_2O_3$ |
|---|---|---|---|---|---|
| wt % | 52.0-56.0 | 1.0-2.0 | 41.0-45.0 | 0.05-1.5 | 0.05-3.0 |

In another embodiment, the dielectric material comprises, prior to firing, a blend (in weight percent) of the ingredients in Table 3.

TABLE 3

Alternate formulation of dielectric compositions.

|  | SrO | $ZrO_2$ | $TiO_2$ | MgO | CaO | $Al_2O_3$ | $SiO_2$ |
|---|---|---|---|---|---|---|---|
| wt % | 44.2-45.6 | 50.2-51.8 | 1.5-1.6 | 0.1-0.4 | 0-0.3 | 0.3-1.2 | 0.5-2.2 |

Another embodiment of the present invention is a multilayer ceramic chip capacitor comprising alternately stacked layers of a dielectric material and an internal electrode material comprising a transition metal other than Ag, Au, Pd, or Pt, wherein the dielectric material comprises a sintered blend of any of the formulations of Tables 1, 2, or 3. Yet another embodiment is a lead-free and cadmium-free dielectric paste comprising a solids portion wherein the solids portion comprises a glass component, wherein the glass component comprises, prior to firing, the ingredients of Table 1, Table 2, or Table 3.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
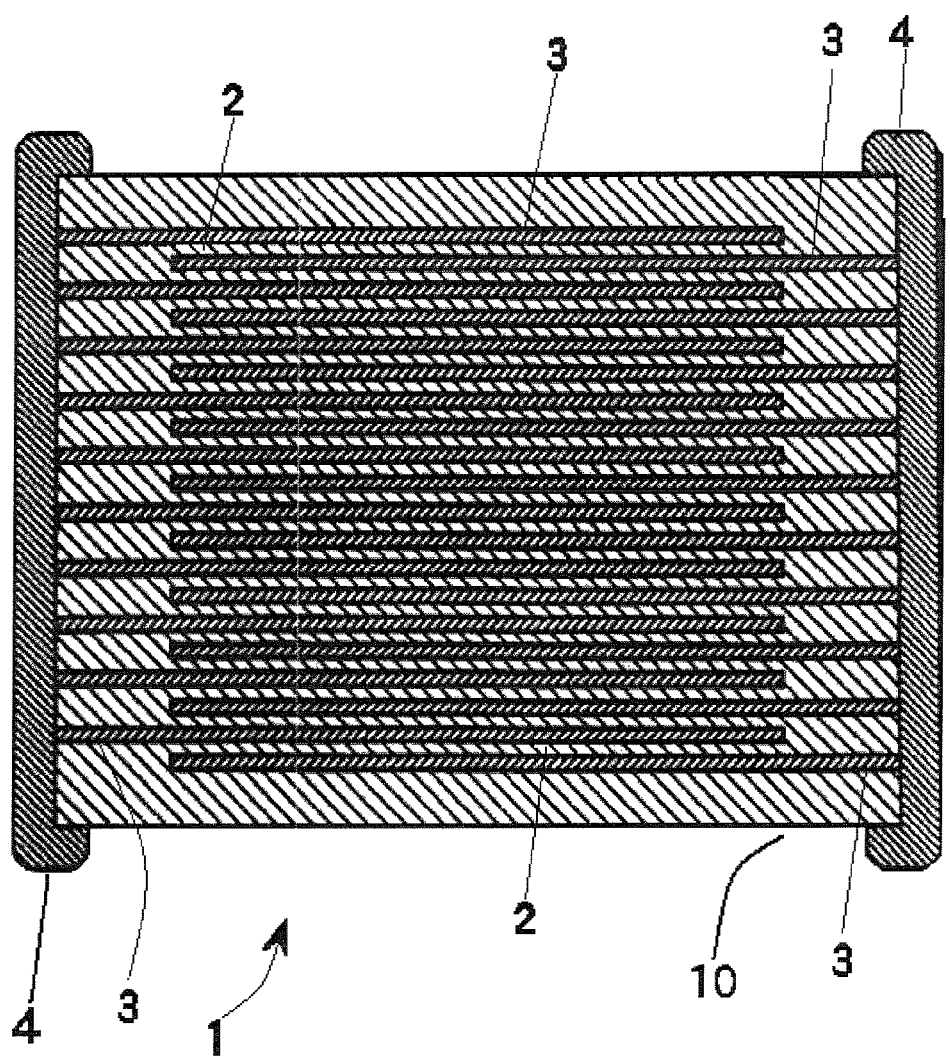
FIG. 1 is a cross-sectional view of a multilayer ceramic chip capacitor according to an embodiment of the invention.

Multilayer chip capacitors are fabricated by alternately stacking dielectric layers and internal electrodes to form green chips. The internal electrodes of interest herein are comprised of base metals including nickel or nickel alloys. The dielectric composition that forms the dielectric layers is produced by wet milling the components of the dielectric with an organic vehicle system. The dielectric composition is deposited on a carrier film, such as polyester or polypropylene, or a belt, such as stainless steel, paper, or a substrate such as alumina or glass, coating the film, and forming sheets, which are alternately stacked with electrodes to form the green chips.

After the green chips are formed, the organic vehicle is removed by heating to a temperature less than about 350° C. in an air atmosphere. Once the vehicle is removed, the green chips are then fired in a reducing atmosphere of wet nitrogen and hydrogen having an oxygen partial pressure of about $10^{-12}$ to about $10^{-8}$ atm, at a temperature of about 1200° C. to about 1350° C. Various heating profiles may be used both for removing the binder and for firing the chip.

The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 1 and in electrical connection with internal electrode layers 3. The capacitor chip 1 has a plurality of alternately stacked dielectric layers 2. The shape of the capacitor chip 1 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 1. That is, the internal electrode layers 3 of one group are exposed at one side surface of the chip 1 and the internal electrode layers 3 of another group are exposed at the opposite side surface of the chip 1. One external electrode 4 is applied to one side surface of the capacitor chip 1 in electrical contact with the internal electrode layers 3 of the one group, and the other external electrode 4 is applied to the opposite side surface of the chip 1 in electrical contact with the internal electrode layers 3 of the other group.

The dielectric layers are formed of a dielectric material formed by sintering a blend including oxides of strontium, titanium and zirconium, as in Tables 1, 2, or 3. A sintering aid including $B_2O_3$, MgO or MgO—CaO—$Al_2O_3$—$SiO_2$—SrO may be useful.

Another route is to begin with strontium titanate and strontium zirconate, as in Tables 4 or 5. It should be evident to those who are familiar with the art that the above mentioned oxides in their hydroxide or other forms such as carbonates, acetates, nitrates, and organometallic compounds such as metal formates, oxalates, etc., have the same effect, so long as the desired metal ion is provided in the desired quantity.

TABLE 4

Alternate formulation of dielectric compositions.

| | $SrTiO_3$ | $SrZrO_3$ | $B_2O_3$ | MgO |
|---|---|---|---|---|
| wt % | 1-7 | 89-99 | 0.05-3 | 0.05-1.5 |

TABLE 5

Alternate formulations for dielectric compositions.

| wt % | $SrCO_3$ | $SrZrO_3$ | $SrTiO_3$ | SrO | $ZrO_2$ | $TiO_2$ | MgO | CaO | $Al_2O_3$ | $SiO_2$ |
|---|---|---|---|---|---|---|---|---|---|---|
| A | 50-58 | | | 0-0.5 | 40-46 | 0.5-3 | 0.05-1 | 0-1 | 0.05-2 | 0.05-3 |
| B | | 90-98 | 2-5 | 0-1 | | | 0.05-2 | 0-1.5 | 0.05-2 | 0.05-3.5 |
| C | | 92.5-95.4 | 3.5-3.6 | | | | 0.1-0.4 | 0-0.3 | 0.3-1.2 | 0-0.3 |
| D | | | | 41.5-48.5 | 47-55 | 0.5-2.5 | 0.05-1 | 0-0.5 | 0.05-2.5 | 0.05-3.5 |

Other compounds may be present in the dielectric material provided that the other compound does not adversely affect dielectric properties. Such compounds are usually found in the raw materials as impurities.

The dielectric compositions herein possess fine crystal grains that typically have a mean size of about 0.5 to about 3 microns, with a grain size of less than about 0.7 micron being preferred.

Each dielectric layer has a thickness of up to about 50 microns. Preferably, the thickness of each dielectric layer is from about 0.5 microns to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life. The number of dielectric layers stacked in a chip capacitor is generally from about 2 to about 800, and preferably from about 3 to about 400.

The multilayer ceramic chip capacitor of the invention generally is fabricated by forming a green chip by conventional printing and sheeting methods using pastes, and firing the green chip. After firing, the chip is tumbled dry in a medium such as alumina or silica to round off corners. Next, a conductive paste, containing, for example, copper is then applied to both ends to connect the exposed inner electrodes together to make terminations. The chip is then termination fired at about 800° C. in a nitrogen atmosphere to sinter the conductor (e.g., copper) into a solid conduction pad at both ends, to form a multilayer capacitor. The terminations are external electrodes 4 as shown in FIG. 1.

Dielectric Pastes. A paste for forming the dielectric layers can be obtained by mixing an organic vehicle with a raw dielectric material, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 microns, and more preferably about 1 micron or less.

Organic Vehicle. The organic vehicle is a binder in an organic solvent or a binder in water. The choice of binder used herein is not critical; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich.

Alternatively, the binder could be selected from polyvinyl alcohol (PVA) or polyvinyl acetate (PVAC) in combination with water. It should be noted that PVA and PVAC are generally not compatible with boron containing ceramic dielectric powders. An aqueous slurry including a boron containing glass together with PVA and/or PVAC tends to suffer severe gelation. Therefore, ceramic dielectric powders that do not contain boron, as disclosed in this invention, are of particular importance for water based slurry processing.

No particular limit is imposed on the organic vehicle content of the respective pastes (dielectric or electrode pastes). Often the paste contains about 1 to 5 wt % of the binder and about 10 to 50 wt % of the organic solvent, with the balance being either the metal component (for an electrode) or a dielectric component (for a dielectric layer). If desired, the respective pastes may contain up to about 10 wt % of other additives such as dispersants, plasticizers, dielectric compounds, and insulating compounds.

Internal Electrode. A paste for forming internal electrode layers is obtained by mixing an electro-conductive material with an organic vehicle. The conductive material used herein includes conductors such as conductive metals and alloys as mentioned herein and various compounds which convert into such conductors upon firing, for example, oxides, organometallic compounds and resinates. An example of a suitable nickel paste is EL51-012 nickel paste from Ferro Corporation.

With reference to FIG. 1, the conductor that forms the internal electrode layers 3 is not critical, although a base metal preferably is used since the dielectric material of the dielectric layers 2 has anti-reducing properties. Typical base metals include nickel and its alloys. Preferred nickel alloys contain at least one other metal selected from Mn, Cr, Co, Cu, and Al. Alloys containing at least about 95 wt % of nickel are preferred. It is to be noted that nickel and nickel alloys may contain up to about 0.1 wt % of phosphorous and other trace components (i.e., impurities). The thickness of the internal electrode layers may be controlled to suit a particular application, but the layers are typically up to about 5 microns thick. Preferably, an internal electrode layer has a thickness of about 0.5 to about 5 microns and more preferably about 1 to about 5 microns.

External Electrode. The conductor that forms the external electrodes 4 is not critical, although inexpensive metals such as copper, nickel, and alloys of either or both, optionally containing Mn, Cr, Co, or Al, are preferred. The thickness of the external electrode layers may be controlled to suit a particular application, but the layers are typically up about 10 to about 50 microns thick, preferably about 20 to about 40 microns thick. Paste for forming external electrodes is prepared by the same method as for the internal electrodes.

A green chip then may be prepared from the dielectric layer-forming paste and the internal electrode layer-forming paste. In the case of a printing method, a green chip is prepared by alternately printing the pastes onto a substrate of a polyester film, (e.g., polyethylene terephthalate (PET)), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. After the organic vehicle is removed from the green chip, it is fired. The organic vehicle may be removed under conventional conditions, by heating at a rate of 0.01° C. to 20° C./hour, more preferably about 0.03-0.1° C./hour, with a hold temperature of about 150° C. to about 350° C., preferably about 200° C. to about 300° C., more preferably about 250° C., and a hold time of about 30-700 minutes, preferably about 200-300 minutes in an air atmosphere.

Firing. The green chip is then fired in an atmosphere, which is determined according to the type of conductor in the internal electrode layer-forming paste. Where the internal electrode layers are formed of a base metal conductor such as nickel and nickel alloys, the firing atmosphere may have an oxygen partial pressure of about $10^{-12}$ to about $10^{-8}$ atm. Sintering at a partial pressure lower than about $10^{-12}$ atm should be avoided, since at such low pressures the conductor can be abnormally sintered and may become disconnected from the dielectric layers. At oxygen partial pressures above about $10^{-8}$ atm, the internal electrode layers may be oxidized. Oxygen partial pressures of about $10^{-11}$ to about $10^{-9}$ atm are most preferred.

For firing, the temperature is raised from room temperature to a peak temperature of from about 1150° C. to about 1350° C., more preferably from about 1250° C. to about 1350° C. The temperature is held for about two hours to enhance densification. Lower hold temperatures provide insufficient densification whereas higher hold temperatures can lead to very large grains. The firing is preferably conducted in a reducing atmosphere. An exemplary firing atmosphere includes wet $N_2$, or a humidified mixture of $N_2$ and $H_2$ gases. The sintering ramp rate is about 50° C. to about 500° C./hour, preferably about 200° C. to 300° C./hour; hold temperature of about 1200° C. to about 1350° C., preferably about 1250° C. to about 1350° C., more preferably about 1275° C. to about 1325° C. The hold time is about 0.5 to about 8 hours, preferably about 1 to 3 hours, and the cooling rate is about 50° C. to 500° C./hour, preferably about 200° C. to 300° C./hour.

The organic vehicle removal and firing may be carried out either continuously or separately. If continuously, the process includes organic vehicle removal, changing the atmosphere without cooling, heating to the firing temperature, holding at the firing temperature for a specified time and cooling afterwards. If separately, after organic vehicle removal and cool down, the temperature of the chip is raised to the sintering temperature and the atmosphere then is changed to a reducing atmosphere.

The resulting chip may be polished at end faces by barrel tumbling and/or sand blasting, for example, before the external electrode-forming paste is printed or transferred and fired to form external electrodes (terminations). Firing of the external electrode-forming paste may be carried out in a dry nitrogen atmosphere (about $10^{-6}$ atm oxygen partial pressure), at about 600° C. to 800° C., for about 10 minutes to about 1 hour.

If necessary, pads are formed on the external electrodes by plating or other methods known in the art. The multilayer ceramic chip capacitors of the invention can be mounted on printed circuit boards, for example, by soldering.

EXAMPLES

The following examples are provided to illustrate preferred aspects of the invention and are not intended to limit the scope of the invention.

Overview. Multilayer ceramic capacitors with pure nickel electrodes, 10 active layers, with each layer being 5 to 10 microns thick were prepared and sintered in a reducing atmosphere ($pO_2$ of $10^{-11}$ to $10^{-8}$ atm) at 1275° C. to 1350° C. Physical and electrical measurements were carried out. The fired chips exhibited a dielectric permittivity over 30, DF<0.1% at 1 MHz, TCC of less than ±30 ppm/° C. from −55° C. to +125° C., IR>$10^{13}$ ohms at 25° C., IR>$10^{12}$ ohms at 125° C. The dielectric breakdown voltage exceeds 140 V/micron. Reliability test was conducted by subjecting chips at 140° C. with 300V DC voltage applied. No failure was observed after 115 hours.

Example 1

A dielectric composition identified as Precursor 1 was formed by mixing, blending, and/or milling in water appropriate amounts of the oxides as shown in Table 6. The powders were mixed at high shear (about 5000/min) with 1% Darvan® C, a polymeric deflocculant available from RT Vanderbilt Co., Inc., Norwalk, Conn. The mixed powders were bead milled to a particle $D_{50}$ of about 0.65 micron using 0.5 mm YTZ (yttria stabilized zirconia). The powders are calcined at 1200° C. for 5 hours. The calcined powders are then pulverized by conventional means to afford Precursor 1.

TABLE 6

Formulation of Precursor 1 prior to calcination.

|  | $SrCO_3$ | $ZrO_2$ | $TiO_2$ |
|---|---|---|---|
| wt % | 54.901 | 43.761 | 1.337 |

Alternately, the composition of Precursor 1, after calcination, can be represented by the following expression: $SrZr_{0.955}Ti_{0.045}O_3$. To Precursor 1 was added $2MgO \cdot 3B_2O_3$ (as a combination of $Mg(OH)_2$ and $H_3BO_3$), as a sintering flux, in accordance with the formulation in Table 7. Again, the blended powders are mixed at high shear (about 5000/min), bead milled to a particle $D_{50}$ of about 0.40 micron using 0.5 mm YTZ, dried and pulverized by conventional means to afford the dielectric powder of Example 1.

TABLE 7

Formulation of Example 1 dielectric powder prior to firing.

|  | Precursor 1 | $Mg(OH)_2$ | $H_3BO_3$ |
|---|---|---|---|
| wt % | 98.377 | 0.787 | 0.836 |

The powder of Example 1 contains the combination of simple oxides as set forth in Table 8 and has a formula that may be expressed alternately as: 98.979 wt % of $SrZr_{0.955}Ti_{0.045}O_3$+0.547 wt % of MgO+0.474 wt % $B_2O_3$.

TABLE 8

Oxide ingredients of Example 1 dielectric powder.

|  | SrO | $ZrO_2$ | $TiO_2$ | MgO | $B_2O_3$ |
|---|---|---|---|---|---|
| wt % | 45.606 | 51.791 | 1.583 | 0.547 | 0.474 |
| Mol % | 48.869 | 46.669 | 2.199 | 1.507 | 0.756 |

The final powders had an average particle size of 0.3 to 1 micron. One hundred grams of the above powders was then added to 28.8 grams of an organic vehicle comprising polyvinyl butanol, toluene, and ethanol, and wet milled for 24 hours to prepare a slurry for tape casting. The wet slurry was coated on a polyester film to form dielectric green tapes. The thickness of the dielectric green tapes was from about 5 to about 15 microns depending on the specific testing to be performed on them. Nickel electrodes were printed onto the dried green dielectric tape by conventional screen-printing methods using a conventional nickel paste. A total of 10 sheets were stacked and bonded under a pressure of 5100 psi and a temperature of 130° F. (54° C.) to form a green chip. After dicing to a suitable dimension so that, after sintering and shrinkage, (which is typically from 15% to 20% in both X and Y directions), the chip dimension is about 0.12"(L)×0.06" (W) (EIA1206 size) or 0.08"(L)×0.05" (W) (EIA0805 size), the green chip was heated to remove the organic vehicle accordance with the burn-out cycle of Table 9.

TABLE 9

Binder removal conditions.

| Stage | Temp (° C.) | Duration (min) | Atmosphere |
|---|---|---|---|
| Ramp from room temp | 265 | 1200 | Air |
| Soak | 265 | 240 | Air |
| Cool to room temp | 25 | to reach 25° C. | Air |

For all examples, chips first had their binder removed at a temperature of about 265° C. (Table 9) and then were sintered at a temperature from 1250° C. to 1350° C. in a gas mixture of $N_2/H_2/H_2O$ at a $pO_2$ from $10^{-11}$ to $10^{-8}$ atm. The gas mixture was achieved by humidifying the $N_2/H_2$ gases through a wetter with a water temperature of 35° C. The chip thus obtained was corner rounded by tumbling. An external electrode forming copper paste available as TM50-081 from Ferro Corporation of Cleveland, Ohio was applied to the end faces and fired in a dry nitrogen atmosphere at 775° C. for about 70 minutes to form external electrodes. The multilayer capacitor thus processed had dimensions of about 3.2 mm×1.6 mm (EIA 1206 size) or about 2.1 mm×1.3 mm (EIA0805 size) with variable thickness. The dielectric layers were 6 to 15 microns thick, and the internal nickel electrode layers were about 1.5 microns thick.

Multilayer chip capacitors were made from the powders of Example 1 and tested. Firing conditions as well as electrical properties are summarized in Table 10. All examples (1a to 1g) in Table 10 were fired at the indicated temperature for 2 hours.

TABLE 10

Firing conditions and electrical properties for MLCCs of Example 1.

| Example | 1a | 1b | 1c | 1d | 1e | 1f | 1g |
|---|---|---|---|---|---|---|---|
| Sintering Temp (° C.) | 1275 | 1275 | 1300 | 1300 | 1325 | 1325 | 1325 |
| $pO_2$ (atm) | $10^{-10}$ | $10^{-11}$ | $10^{-10}$ | $10^{-11}$ | $10^{-8}$ | $10^{-9}$ | $10^{-10}$ |
| Dielectric Thickness (microns) | 5.0 | 4.7 | 5.1 | 5.0 | 5.2 | 5.0 | 5.4 |
| Capacitance (pF) | 386.5 | 363.2 | 412.2 | 391.8 | 422.6 | 418.5 | 406.5 |
| DF (%) | 0.019 | 0.003 | 0.007 | 0.008 | 0.023 | 0.013 | 0.023 |
| Dielectric Constant | 30.0 | 27.9 | 34.8 | 32.5 | 38.4 | 36.3 | 29.5 |
| TCC (ppm/° C.) | | | | | | | |
| 25° C. | −12.4 | −12.2 | −6.7 | −12.2 | −11.6 | −8.8 | −3.8 |
| 85° C. | −2.2 | −3.8 | −0.3 | −3.4 | −7.8 | −1.0 | 3.3 |
| 125° C. | −1.8 | −2.6 | 1.0 | −2.2 | −1.8 | 0.0 | 7.0 |
| IR ($10^{12}$ OHM) | | | | | | | |
| 25° C. | 900 | 760 | 270 | 440 | 390 | 660 | 420 |
| 125° C. | 47.0 | 8.6 | 13.0 | 5.8 | 6.3 | 7.5 | 9.8 |
| Breakdown Voltage (V) | 1060 | 945 | 977 | 880 | 1005 | 811 | 714 |

Example 2

To precursor 1 was added a mixture of $Mg(OH)_2$, $CaCO_3$, $Al_2O_3$ and $SiO_2$ according to Table 11, as a sintering aid (effectively resulting in $MgO$—$CaO$—$Al_2O_3$—$SiO_2$ after firing). The powder was processed according to Example 1.

TABLE 11

Formulation of Example 2 dielectric prior to firing

| | Precursor 1 | $Mg(OH)_2$ | $CaCO_3$ | $Al_2O_3$ | $SiO_2$ |
|---|---|---|---|---|---|
| wt % | 97.812 | 0.257 | 0.257 | 0.579 | 1.096 |

The powder of Example 2 has a formula that may be expressed alternately as: 98.003 wt % of $SrZr_{0.955}Ti_{0.045}O_3$+ 0.178 wt % of $MgO$+0.144 wt % of $CaO$+0.579 wt % of $Al_2O_3$+1.096 wt % of $SiO_2$. When expressed as simple oxides, the powder of Example 2 has the formulations of Table 12.

TABLE 12

Oxide ingredients of Example 2 dielectric powder.

| | SrO | $ZrO_2$ | $TiO_2$ | MgO | CaO | $Al_2O_3$ | $SiO_2$ |
|---|---|---|---|---|---|---|---|
| Wt % | 45.156 | 51.281 | 1.567 | 0.178 | 0.144 | 0.579 | 1.096 |
| Mol % | 48.288 | 46.115 | 2.173 | 0.489 | 0.285 | 0.629 | 2.021 |

The final powder of Example 2 was processed according to the procedures of Example 1 to fabricate MLCC chips for electrical testing. Firing conditions as well as electrical properties are summarized in Table 13. Examples 2a to 2d in Table 13 were fired at the indicated temperature for 2 hours.

TABLE 13

Firing conditions and electrical properties for MLCCs of Example 2.

| | Example | | | |
|---|---|---|---|---|
| | 2a | 2b | 2c | 2d |
| Sintering Temp (° C.) | 1300 | 1300 | 1325 | 1350 |
| $pO_2$ (atm) | $10^{-10}$ | $10^{-11}$ | $10^{-10}$ | $10^{-10}$ |
| Dielectric Thickness (microns) | 12.3 | 11.3 | 11.0 | 10.9 |
| Capacitance (pF) | 152.7 | 158.2 | 164.7 | 166.5 |
| DF (%) | 0.005 | 0.070 | 0.010 | 0.007 |
| Dielectric Constant | 31.2 | 32.3 | 31.4 | 31.5 |
| TCC (ppm/° C.) | | | | |
| 25° C. | −4.8 | −3.8 | 0.5 | 0.2 |
| 85° C. | 4.5 | 4.0 | 7.3 | 7.2 |
| 125° C. | 4.5 | 5.0 | 8.0 | 7.6 |
| IR ($10^{12}$ OHM) | | | | |
| 25° C. | 100.0 | 31.0 | 5.0 | 34.0 |
| 125° C. | 6.5 | 5.0 | 2.1 | 3.0 |
| Breakdown Voltage (V) | 1726 | 909 | 1565 | 1562 |

Examples 3-14

To Precursor 1 was added various amounts of a mixtures including any or all of MgO, CaO, $Al_2O_3$, $SiO_2$, and/or SrO as a sintering aid in accordance with the formulations of Examples 3-14 in Table 14. Because the sintering aid in Examples 12, 13 and 14 also contain SrO, the total SrO in those examples comes both from Precursor 1 and from the sintering aid. The total weight of Precursor 1 is the sum of the first three columns (SrO, $ZrO_2$ and $TiO_2$) for Examples 3 to 14. For the purpose of easy comparison, the composition and MLCC electrical properties of Example 2 are also included in Tables 14 and 15.

TABLE 14

Oxide ingredients of Examples 2-14 powders (in wt %)

| Example | SrO | $ZrO_2$ | $TiO_2$ | MgO | CaO | $Al_2O_3$ | $SiO_2$ | SrO from sintering aid |
|---|---|---|---|---|---|---|---|---|
| 2 | 45.156 | 51.281 | 1.567 | 0.178 | 0.144 | 0.579 | 1.095 | 0 |
| 3 | 44.236 | 50.236 | 1.535 | 0.355 | 0.288 | 1.158 | 2.192 | 0 |
| 4 | 45.616 | 51.803 | 1.583 | 0.089 | 0.072 | 0.290 | 0.548 | 0 |
| 5 | 45.160 | 51.286 | 1.567 | 0.204 | 0.108 | 0.579 | 1.096 | 0 |

TABLE 14-continued

Oxide ingredients of Examples 2-14 powders (in wt %)

| Example | SrO | ZrO$_2$ | TiO$_2$ | MgO | CaO | Al$_2$O$_3$ | SiO$_2$ | SrO from sintering aid |
|---|---|---|---|---|---|---|---|---|
| 6 | 45.165 | 51.291 | 1.567 | 0.230 | 0.072 | 0.579 | 1.096 | 0 |
| 7 | 45.170 | 51.296 | 1.567 | 0.255 | 0.036 | 0.579 | 1.096 | 0 |
| 8 | 45.174 | 51.307 | 1.567 | 0.281 | 0.000 | 0.579 | 1.096 | 0 |
| 9 | 45.305 | 51.450 | 1.572 | 0.178 | 0.144 | 0.581 | 0.770 | 0 |
| 10 | 45.355 | 51.506 | 1.574 | 0.178 | 0.145 | 0.582 | 0.661 | 0 |
| 11 | 45.405 | 51.563 | 1.575 | 0.179 | 0.145 | 0.582 | 0.551 | 0 |
| 12 | 45.173 | 52.265 | 1.566 | 0.178 | 0.108 | 0.579 | 1.096 | 0.036 |
| 13 | 45.190 | 51.249 | 1.566 | 0.177 | 0.072 | 0.579 | 1.095 | 0.072 |
| 14 | 45.221 | 51.218 | 1.565 | 0.177 | 0.000 | 0.578 | 1.095 | 0.146 |

The final powders of Examples 3-14 were processed according to the procedures of Example 1 to fabricate MLCC chips for electrical testing. Firing conditions as well as electrical properties are summarized in Table 14. The MLCCs were fired for two hours each.

TABLE 15

Firing conditions and electrical properties for MLCCs of Examples 2d-15.

| Example | 2d | 3 | 4 | 5 | 6 | 7 | 8 |
|---|---|---|---|---|---|---|---|
| Sintering Temp (°C.) | 1350 | 1325 | 1350 | 1350 | 1350 | 1350 | 1350 |
| pO$_2$ (atm) | $10^{-10}$ | $10^{-11}$ | $10^{-10}$ | $10^{-10}$ | $10^{-10}$ | $10^{-10}$ | $10^{-10}$ |
| Dielectric Thickness (microns) | 10.9 | 19.0 | 3.5 | 10.3 | 10.7 | 11.3 | 10.8 |
| Capacitance (pF) | 166.5 | 313.1 | 502.3 | 180.2 | 173.2 | 166.8 | 172.8 |
| DF (%) | 0.007 | 0.016 | 0.012 | 0.033 | 0.012 | 0.006 | 0.294 |
| Dielectric Constant | 31.5 | 31.0 | 31.0 | 31.5 | 31.7 | 32.0 | 30.8 |
| TCC (ppm/°C.) | | | | | | | |
| 25° C. | 0.2 | −2.4 | 2.4 | −3.7 | −5.6 | −6.6 | −2.8 |
| 85° C. | 7.2 | 7.0 | −2.8 | 4.3 | 2.6 | 2.6 | 1.6 |
| 125° C. | 7.6 | 8.4 | 10.0 | 7.6 | 4.7 | 3.0 | 2.2 |
| IR (10$^{12}$ OHM) | | | | | | | |
| 25° C. | 34 | 71 | 440 | 85 | 47 | 89 | 17 |
| 125° C. | 3.0 | 3.0 | 1.7 | 1.8 | 1.8 | 1.7 | 1.2 |
| Breakdown Voltage (V) | 1582 | 1663 | 595 | 765 | 1259 | 1419 | 401 |

| Example | 9 | 10 | 11 | 12 | 13 | 14 |
|---|---|---|---|---|---|---|
| Sintering Temp (°C.) | 1325 | 1325 | 1325 | 1325 | 1325 | 1325 |
| pO$_2$ (atm) | $10^{-10}$ | $10^{-10}$ | $10^{-10}$ | $10^{-10}$ | $10^{-10}$ | $10^{-10}$ |
| Dielectric Thickness (microns) | 13.0 | 11.4 | 12.6 | 13.5 | 13.1 | 12.4 |
| Capacitance (pF) | 163.5 | 169.2 | 168.9 | 159.4 | 163.9 | 151.5 |
| DF (%) | 0.010 | 0.011 | 0.017 | 0.009 | 0.015 | 0.007 |
| Dielectric Constant | 35.5 | 30.6 | 34.7 | 37.2 | 39.8 | 33.0 |
| TCC (ppm/°C.) | | | | | | |
| 25° C. | −4.2 | −4.0 | 1.0 | −6.2 | −2.0 | −7.0 |
| 85° C. | 2.8 | 3.4 | 7.0 | 2.0 | 6.0 | 1.2 |
| 125° C. | 6.3 | 4.2 | 7.0 | 2.8 | 6.5 | 2.0 |
| IR (10$^{12}$ OHM) | | | | | | |
| 25° C. | 140 | 140 | 250 | 57 | 57 | 98 |
| 125° C. | 4.4 | 2.7 | 6.4 | 8.9 | 2.5 | 2.1 |
| Breakdown Voltage (V) | 1892 | 1605 | 1735 | 1533 | 1036 | 1578 |

The exemplary chips made from the composition of Examples 1-14 all have very high dielectric constants, low DF, small fired grain sizes, and high breakdown voltages. The TCC meets the COG standard and the IR at 25° C. and 125° C. all exceed EIA specifications.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A lead-free and cadmium-free dielectric paste comprising a solids portion wherein the solids portion comprises, prior to firing:
    a. about 44.2 wt % to about 45.6 wt % SrO,
    b. about 50.2 wt % to about 51.8 wt % $ZrO_2$,
    c. about 0.1 wt % to about 0.4 wt % MgO,
    d. about 1.5 wt % to about 1.6 wt % $TiO_2$,
    e. about 0.3 to about 1.2 wt % $Al_2O_3$,
    f. about 0.5 to about 2.2 wt % $SiO_2$, and
    g. up to about 0.3 wt % CaO.

2. A method of forming an electronic component comprising:
    a. applying the dielectric paste of claim 1 to a substrate and
    b. firing the substrate at a temperature sufficient to sinter the dielectric material.

3. The method of claim 2 wherein the firing is conducted at a temperature of 1200° C.-1350° C., and in an atmosphere having a partial oxygen pressure of about $10^{-12}$ atm to about $10^{-8}$ atm.

4. A multilayer ceramic chip capacitor comprising a fired collection of:
    a. alternately stacked layers of the dielectric material of claim 1 and
    b. layers of an internal electrode material comprising a transition metal other than Ag, Au, Pd, or Pt.

5. The multilayer ceramic chip capacitor of claim 4 wherein the internal electrode material comprises nickel.

6. A method of forming an electronic component comprising:
    a. alternately applying layers of
        i. an oxide-containing dielectric material comprising the paste of claim 1 and
        ii. a metal-containing electrode paste onto
        iii. a substrate to form a laminar stack,
    b. firing the substrate at a temperature sufficient to sinter the dielectric material,
    c. cutting the laminar stack to a predetermined shape,
    d. separating the cut stack from the substrate, and
    e. firing the stack to sinter the metal in the electrode and fuse the oxides in the dielectric material, wherein the internal electrode and the dielectric material each have a layer thickness.

7. The method of claim 6 wherein the layers of dielectric material, after firing, have a thickness of about 1 microns to about 50 microns.

8. The method of claim 6 wherein the firing is conducted at a temperature of 1200° C. to about 1325° C.

9. The method of claim 6 wherein the firing is conducted in an atmosphere having a partial oxygen pressure of about $10^{-12}$ atm to about $10^{-8}$ atm.

10. The method of claim 6 wherein the metal-containing electrode paste comprises nickel.

11. A lead-free and cadmium-free dielectric paste comprising a solids portion wherein the solids portion consists essentially of, prior to firing:
    a. about 44.2 wt % to about 45.6 wt % SrO,
    b. about 50.2 wt % to about 51.8 wt % $ZrO_2$,
    c. about 0.1 wt % to about 0.4 wt % MgO,
    d. about 1.5 wt % to about 1.6 wt % $TiO_2$,
    e. about 0.3 to about 1.2 wt % $Al_2O_3$,
    f. about 0.5 to about 2.2 wt % $SiO_2$, and
    g. up to about 0.3 wt % CaO.

* * * * *